(12) United States Patent
Sheng (10) Patent No.: US 12,413,657 B2
(45) Date of Patent: Sep. 9, 2025

(54) PORTABLE DEVICE MOUNT SYSTEM

(71) Applicant: Philip T. Sheng, Palo Alto, CA (US)

(72) Inventor: Philip T. Sheng, Palo Alto, CA (US)

( * ) Notice: Subject to any disclaimer, the term of this patent is extended or adjusted under 35 U.S.C. 154(b) by 336 days.

(21) Appl. No.: 18/192,197

(22) Filed: Mar. 29, 2023

(65) Prior Publication Data

US 2023/0328165 A1 Oct. 12, 2023

Related U.S. Application Data

(60) Provisional application No. 63/328,110, filed on Apr. 6, 2022.

(51) Int. Cl.
| | |
|---|---|
| *H04M 1/12* | (2006.01) |
| *F16M 11/04* | (2006.01) |
| *F16M 11/18* | (2006.01) |
| *F16M 11/28* | (2006.01) |
| *F16M 13/02* | (2006.01) |
| *G03B 17/56* | (2021.01) |
| *F16M 11/12* | (2006.01) |

(52) U.S. Cl.
CPC ............ *H04M 1/12* (2013.01); *F16M 11/041* (2013.01); *F16M 11/18* (2013.01); *F16M 11/28* (2013.01); *F16M 13/022* (2013.01); *G03B 17/561* (2013.01); *F16M 11/126* (2013.01); *F16M 2200/00* (2013.01); *F16M 2200/027* (2013.01)

(58) Field of Classification Search
CPC ........ H04M 1/12; H04M 1/04; F16M 11/041; F16M 11/18; F16M 11/28; F16M 13/022; F16M 11/126; F16M 2200/00; F16M 2200/027; F16M 11/14; F16M 11/2057; G03B 17/561

See application file for complete search history.

(56) References Cited

U.S. PATENT DOCUMENTS

| | | | |
|---|---|---|---|
| 5,538,212 A | 7/1996 | Kennedy | |
| 8,152,389 B1* | 4/2012 | Lammens | G03B 17/561 |
| | | | 396/419 |
| 10,288,987 B2* | 5/2019 | Olmos-Calderon | |
| | | | G03B 17/566 |
| 11,221,544 B1 | 1/2022 | York | |
| 2003/0161622 A1 | 8/2003 | Zantos | |
| 2004/0096207 A1 | 5/2004 | Nakatani | |
| 2008/0107413 A1* | 5/2008 | Moore | G03B 17/561 |
| | | | 396/428 |
| 2009/0014605 A1* | 1/2009 | Kehl | F16M 11/34 |
| | | | 248/161 |
| 2010/0155549 A1 | 6/2010 | Robinson | |
| 2011/0216415 A1* | 9/2011 | Engblom | G06F 1/1609 |
| | | | 359/609 |
| 2012/0235001 A1* | 9/2012 | Somuah | B60R 11/0252 |
| | | | 248/287.1 |
| 2014/0037281 A1 | 2/2014 | Carney | |
| 2014/0205276 A1 | 7/2014 | Johnston et al. | |

(Continued)

*Primary Examiner* — Alison Slater (57) ABSTRACT

A portable device mount system is provided that enables a user to record an event, such as a tennis match. The portable device mount system includes a telescopic pole, a hanger configured to mount onto a structure such as a fence rail, an electronic device holder that tilts forward and backward, and a sunshade coupled to the device holder. The portable device mount system may also include a ball joint that allows the sunshade to be pointed in multiple directions, a power source, securing mechanisms, set points, and other features.

7 Claims, 9 Drawing Sheets

(56) References Cited

U.S. PATENT DOCUMENTS

| | | | |
|---|---|---|---|
| 2015/0185591 A1 | 7/2015 | Jorgenson | |
| 2015/0381785 A1* | 12/2015 | Gander | H04M 1/04 455/575.1 |
| 2019/0037985 A1* | 2/2019 | Jin | A45B 17/00 |
| 2019/0072996 A1* | 3/2019 | Pickens | G06F 1/1626 |
| 2020/0032950 A1* | 1/2020 | Abraham | H04M 1/04 |
| 2023/0161230 A1* | 5/2023 | Hahn | F21V 7/28 396/428 |

* cited by examiner

PORTABLE DEVICE MOUNT SYSTEM

CROSS REFERENCE TO RELATED APPLICATIONS

This application claims priority to provisional U.S. patent application entitled "DEVICE MOUNTING SYSTEM," filed Apr. 6, 2022, having Ser. No. 63/328,110, the disclosure of which is hereby incorporated by reference in its entirety.

TECHNICAL FIELD

The present invention generally relates to a device mount system and, in particular embodiments, to a portable device mount system for use in recording sports or other recreational events.

BACKGROUND

As the market for small electronic devices has continued to expand, the availability and accessibility of cameras have similarly experienced growth. The camera industry has experienced significant expansion due to the improvement of digital photography and the introduction of high-quality digital image sensors into a growing field of small electronic devices, such as webcams, wireless network compatible cameras, handheld camcorders, action cameras, and smartphones. Moreover, technology related to analyzing, uploading, streaming, and/or replaying recorded content immediately or in real time either on the same device or on another device has made significant advancements. For example, users can record a sporting event, such as a tennis match, using a smartphone and stream the match live to an audience or perform player analysis or review a line call immediately or in real time.

With such advancements, there is an increasing need for a device mount system that is portable and adjustable and that enables a user to record an event for long periods of time and in different environments. Using tennis again as an example, directors of tennis tournaments often require competitors to play multiple tennis matches in a single day with only short breaks in between. Each match is often played on a different tennis court, or even at a different tennis facility, where each court is positioned differently relative to the sun. The sun is also changing position throughout the day and throughout a long tennis match. Tennis courts are often enclosed by a fence or wall of varying thickness and height and may have other structures, such as a conduit or pipe, running along the tops of the fence or wall. Sometimes the top of the fence or wall is not level with the ground and is slanted by design or because of deteriorating conditions. There does not currently exist a satisfactory device mount system for recording tennis matches or other events under the same or similar circumstances described above.

The QM-1 "Quick Mount" Portable Camera Mount, described in U.S. Pat. No. 8,152,389, is well known in the art and perhaps the most widely used portable camera mount on the market for recording tennis matches. However, the QM-1 Quick Mount suffers many shortcomings that have not been solved until the present invention. For example, the QM-1 Quick Mount does not offer any solution with respect to providing shade to a user's device or protecting a user's device from the sun. Many small electronic devices will overheat, malfunction, or experience battery drain from being exposed to the sun for even short periods of time. Moreover, exposing expensive electronic equipment to direct sunlight for hours at a time is generally not advisable and will decrease not just the battery life but the overall life of the device as well.

As another example of one of its shortcomings, the QM-1 Quick Mount does not include a power source to power or charge a user's device while recording. Using tennis again as an example, competitors are often only given short breaks in between matches, and there is often not enough time to recharge the device or find a power receptacle to recharge the device in between matches. Carrying around spare batteries is not ideal, and replacing a device's battery with a spare battery during a match might disrupt the match and will also cause part of the match not to be recorded. Many electronic devices, such as smartphones, do not even allow users to remove and replace a battery with a spare battery. While it is possible to attach an external battery pack to the QM-1 Quick Mount, this is not desirable because it adds to the bulkiness of the QM-1 Quick Mount, requires the user to carry around an external battery pack, and may cause the system to be unevenly weighted on one side. A power source integrated into the device mount system would solve these problems.

As yet another example of a shortcoming, the metal hanger of the QM-1 Quick Mount is not adjustable and is intentionally designed to fit on only a specific size fence rail (around 2 inches thick). A user cannot expand or contract the hanger to accommodate different size structures or account for structures such as a conduit or pipe running along a fence rail. This prevents the QM-1 Quick Mount from fitting securely—or fitting at all—on structures of varying sizes. Moreover, the QM-1 Quick Mount relies on friction between the metal hanger and fence rail to prevent camera movement. There is no other securing mechanism and, as a result, the QM-1 Quick Mount cannot prevent camera movement when there is no friction between the rail and metal hanger, such as when the rail is not of sufficient thickness.

As yet another example of a shortcoming of the QM-1 Quick Mount, a device can only be tilted forward and backward and cannot be rotated when mounted in the QM-1 Quick Mount. Specifically, the QM-1 Quick Mount has a metal arm with a screw that is designed to screw directly into a user's device. This requires the user's device to have a screw hole, which many do not, and it presents a problem when trying to use the QM-1 Quick Mount on a fence rail that is slanted because a device cannot be rotated when screwed into the QM-1 Quick Mount. For example, if a fence rail is slanted (possibly by design or due to deteriorating conditions of the fence) the device's view will not be level. As described in U.S. Pat. No. 8,152,389, the QM-1 Quick Mount's solution to this problem is to again rely on friction between the metal hanger and fence rail to hold the QM-1 Quick Mount at a desired angular/slanted position to obtain a level view. This is not possible when there is no friction between the metal hanger and fence rail.

These are just some examples of shortcomings of the QM-1 Quick Mount, and they are shared by other device mount systems known in the art. The present invention solves these problems by providing a device mount system that is portable and adjustable and that includes various features such as a sunshade and power source.

BRIEF DESCRIPTION OF THE DRAWINGS

Aspects of the present invention can be better understood from the following description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF ILLUSTRATIVE EMBODIMENTS

The following disclosure provides different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments discussed herein may be discussed in a specific context, for example, a device mount system for recording sporting events. It should be understood that the present invention is not limited to recording sporting events and may be used in other contexts and for recording different types of events. It should also be understood that the present invention can be used to capture still images of an event as well as record video or just audio content.

The portable device mount system can be mounted on a top rail of a fence to allow a device to be above the fence and record the sporting event on either side of the fence by mounting the device mount system on either side of the fence or facing the device in either direction. Also, by enabling the device to be above the fence, the device is able to capture a larger portion of the field of play. The portable device mount system is not limited to being mounted on the top of a fence or at the top of a wall, but can be mounted on any suitable point or ledge in the fence or wall any distance from the ground. The portable device mount system can also be permanently affixed to the top of a fence, wall, or other structure. Reference to the device mount system being "portable" is not intended to limit a user's ability to affix the device mount system to a structure. The portable device mount system can include, among other things, a telescopic pole, an adjustable hanger to mount to a wall, fence, fence rail, fence mesh, fence diamond, pole, conduit, etc., an adjustable device holder, an adjustable sunshade, a power source, and one or more mechanisms to secure the pole to the wall, fence, etc.

Figure 1:
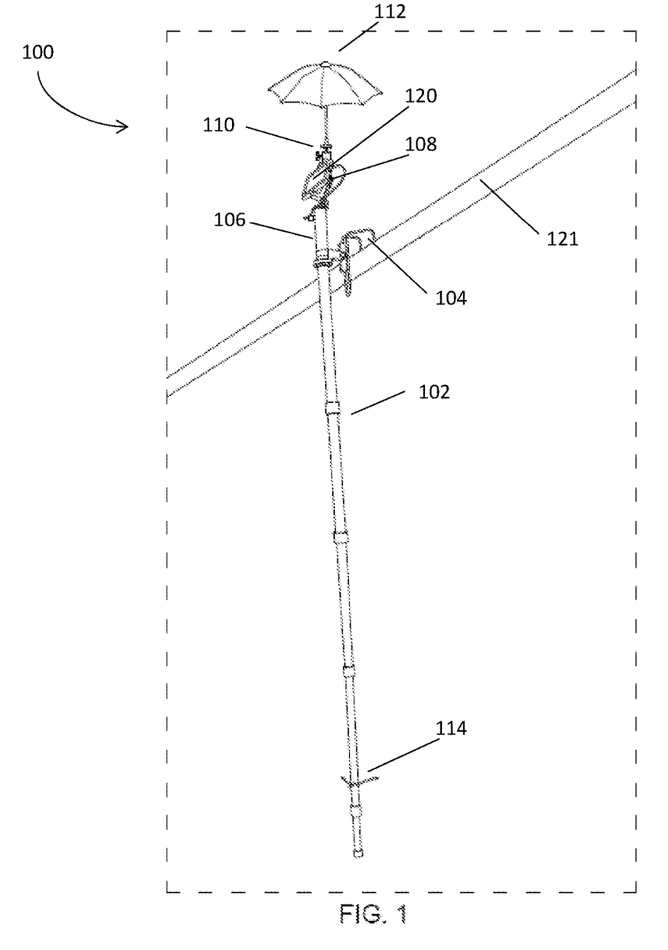
FIG. 1 is a portable device mount system mounted on a fence rail in accordance with some embodiments.

FIG. 1 shows a portable device mount system 100 in accordance with some embodiments. The portable device mount system 100 includes a pole 102, a first end (upper end in FIG. 1) of the pole 102, a hanger 104, and a securing mechanism 114 on an opposite end (lower end in FIG. 1) of the pole 102. In some embodiments, the pole 102 is a telescopic pole that can be lengthened or shortened depending on the needs of the user or the mounting environment, such as the height of a fence. The pole 102 may have multiple telescoping sections that can be extended or retracted and locked in a desired position using means known in the art, such as twist locks or flip locks. In an embodiment, the pole 102 may be extended to a length greater than 60 inches and may be able to be shortened to be shorter than 30 inches. In some embodiments, the pole 102 may be separated into multiple sections or detached from other parts of the system for easier transport.

Figure 3:
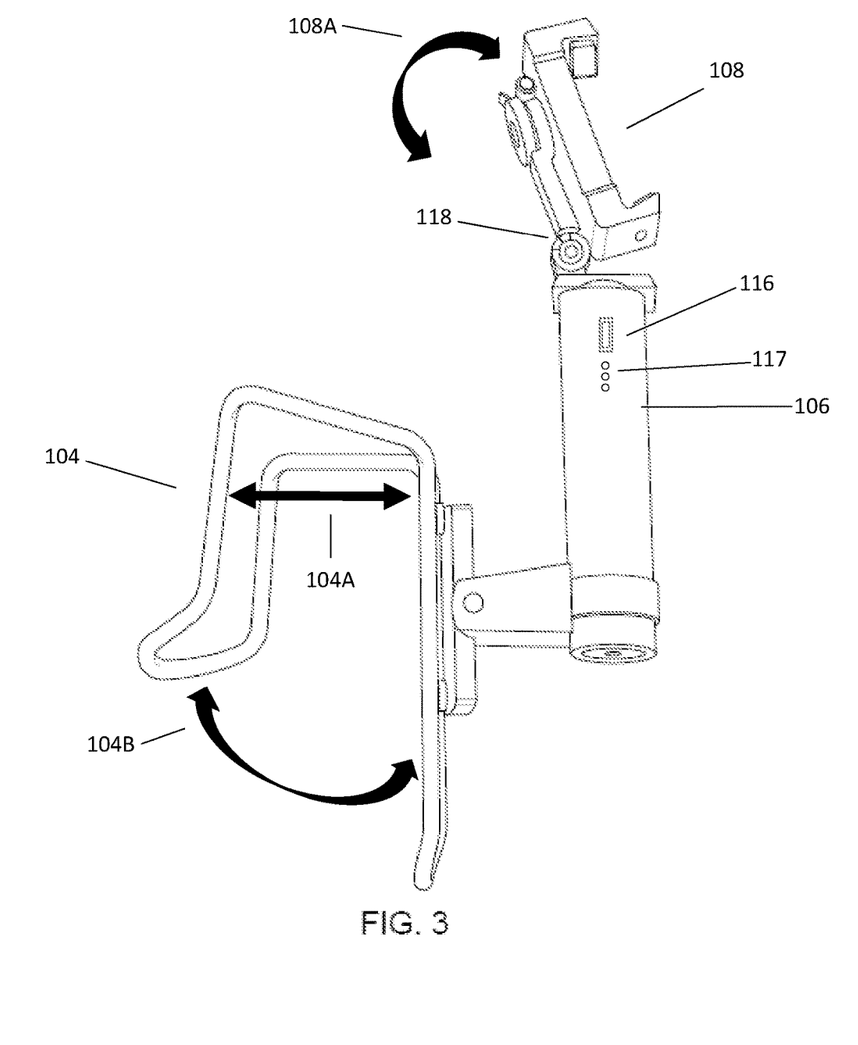
FIG. 3 is a view of a hanger, power source, and device holder in accordance with some embodiments.

The hanger 104 is configured to mount the portable device mount system 100 to a fence rail 122 or any other suitable structure for the system to be mounted. As shown in FIG. 3, the hanger 104 can be adjustable and configured to expand or contract in a direction 104A and may be rotated relative to the pole 102 in a direction 104B. The hanger 104 can also be configured to rotate clockwise or counterclockwise or pivot side to side, and can face the same or opposite direction as the device 120. The mechanism of hanger 104 that enables the hanger to expand or contract may be any suitable method such as a mechanism that uses dials, screws, sliders, a bendable hanger frame, the like, or a combination thereof, and can be adjusted manually by a user. Hanger 104 is shown in the figures to be shaped like an upside down "U" (with one side of the "U" optionally longer than the other), but the hanger can take on any other shape or design that allows the portable device mount system 100 to be mounted on a structure, such as an upside down "L" or a crescent shape.

Referring again to FIG. 1, hanger 104 can be expanded greater than the diameter of fence rail 122 so that the hanger rests on fence rail 122 or it can be contracted to squeeze onto rail 122. A securing mechanism 114 is configured to secure the portable device mounting system 100 to prevent movement. The securing mechanism 114 can be located at the bottom of the pole 102 or anywhere along pole 102 or located in or attached to any other parts of the system. In some embodiments, the securing mechanism 114 is configured to prevent theft of the portable device mount system 100, and can also include an alarm that can detect if the system is tampered with or removed from its location as well as a location tracker to assist in recovery. In some embodiments, the securing mechanism 114 is configured to stabilize the portable mount system in case of high wind or contact by athletes or sporting equipment. The securing mechanism 114 may be any suitable mechanism such as a cable, a rope, a bungee cord, a clamping mechanism, a chain, a padlock, a knob, magnetized fastener, the like, or a combination thereof.

The portable device mount system 100 may also include a power source 106 and a device holder 108. The power source 106 may be any suitable source of power for a device 120 mounted in the device holder 108. In some embodiments, the power source is a battery pack, a photovoltaic system, wireless charger, the like, or a combination thereof. Although the power source 106 is illustrated on the first end (upper end in FIG. 1) of the pole 102, the power source 106 can be in any other location along the portable device mount system 100, including being integrated into pole 102. In some embodiments, the power source 106 may be omitted from the portable device mount system 100.

The device holder 108 is near the first end of the pole 102 and is configured to hold a device 120. The device holder 108 is adjustable to accommodate devices of varying size and shape. In some embodiments, the device holder 108 has rotation and translation adjustments and may be capable of up to six degrees of freedom. For example, the device holder 108 can tilt forward or backward in direction 108A as shown in FIG. 3. The device holder can also rotate in the direction of 108B in FIG. 7 and place the device in portrait or landscape mode or anywhere in between. This is useful for when the device mount system is mounted onto a structure that is not level with the ground (e.g., a fence rail that is slanted). In some embodiments, the device holder 108 is configured to automatically tilt or rotate based on information received from device 120. In some embodiments, the device holder 108 is configured such that a user can remotely tilt or rotate the device holder 108 through a remote control or other device, such as a smartphone or smartwatch. The device holder 108 may be configured to hold any type of suitable electronic device 120, such as a smartphone, an action camera, a webcam, or the like. The device holder 108 may have adjustment indicators or set points that can be customized for easier setup. For example, if a user plays tennis often on the same tennis court, the user can adjust the tilt/angle of the device holder to a previously identified set point (described in more detail below in reference to FIG. 3) on the device holder for quicker setup. In some embodiments, the portable device mount system 100 may include one or more levels to indicate if the system or device 120 is level horizontally or vertically relative to the ground, to the pole, to a structure, or any other part of the portable device mount system 100.

The portable device mount system 100 may further include a sunshade 112 coupled to the pole 102, power source 106 (if present), the device 120, the device holder 108, or any other part of the portable device mount system 100. The sunshade 112 can help the device 120 to maintain a lower temperature during recording by protecting the device 120 from the sun, or it can protect the device from rain or other elements. The sunshade 112 may also provide shade to improve lighting, shadowing, or other effects regardless of weather conditions, and it can be used to provide shade from artificial light (such as bright tennis stadium lights) and not just sunlight during the day or outdoors. The sunshade 112 may be coupled to a sunshade arm and also to a ball joint no or other moveable, tiltable, rotatable, or adjustable mechanism to allow the sunshade 112 to be adjusted or repositioned. Although shown in the figures as an umbrella, the sunshade 112 may be of any size or shape and does not need to resemble an umbrella. The sunshade 112 can, for example, be rectangular shape. In some embodiments, the sunshade 112 or sunshade arm or both are configured such that a user can remotely adjust the sunshade or sunshade arm through a remote control or other device, such as a smartphone or smartwatch.

In some embodiments, the portable device mount system 100 is configured to be used on the ground or on top of a surface instead of mounted on a fence or wall. In these embodiments, the lower end of the pole 102 may include legs or a spike or some other base known in the art to allow for use as a monopod.

Figure 2:
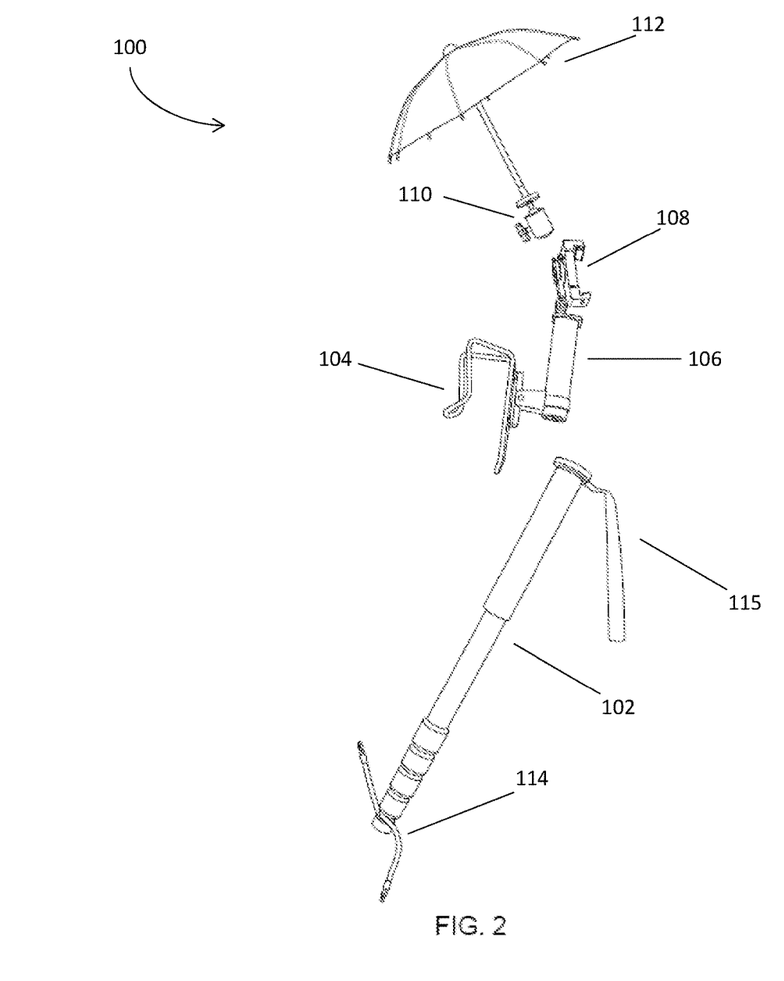
FIG. 2 is a disassembled portable device mount system in accordance with some embodiments.

FIG. 2 shows a disassembled portable device mount system 100 in accordance with some embodiments. The portable device mount system 100 can be disassembled at various points for increased portability. This allows the portable device mount system 100 to be placed in athletic bags, backpacks, or luggage. The portable device mount system 100 can include one or more handles or lanyards 115 for a user to carry the portable device mount system 100 or components of the system when disassembled.

FIG. 3 is a view of a hanger 104, a power source 106, and a device holder 108 in accordance with some embodiments. The hanger 104 can be configured to clamp, squeeze, extend, open, and/or close in a direction 104A and may be rotated in a direction 104B. The hanger 104 can also be configured to rotate clockwise or counterclockwise or pivot side to side, and can face the same or opposite direction as a user's device. The power source 106 is shown in FIG. 3 to include a USB-A port 116 to provide power to a device held in device holder 108, but any cable interface, connector, or protocol can be used. Moreover, the power source 106 can be a battery pack, a photovoltaic system, wireless charger, the like, or a combination thereof. The power source 106 may also include indicator lights 117 to indicate the charge status or charge level of power source 106. Device holder 108 may have adjustment indicators or set points 118 that allow the user to adjust the tilt/angle of the device holder 108 to a previously identified set point for quicker setup. Device holder 108 is shown in FIG. 3 as having top and bottom portions that squeeze a device, but the device holder can be of any design known in the art and can utilize clamps, straps, screw mechanisms, knobs, the like or a combination thereof.

Figure 4:
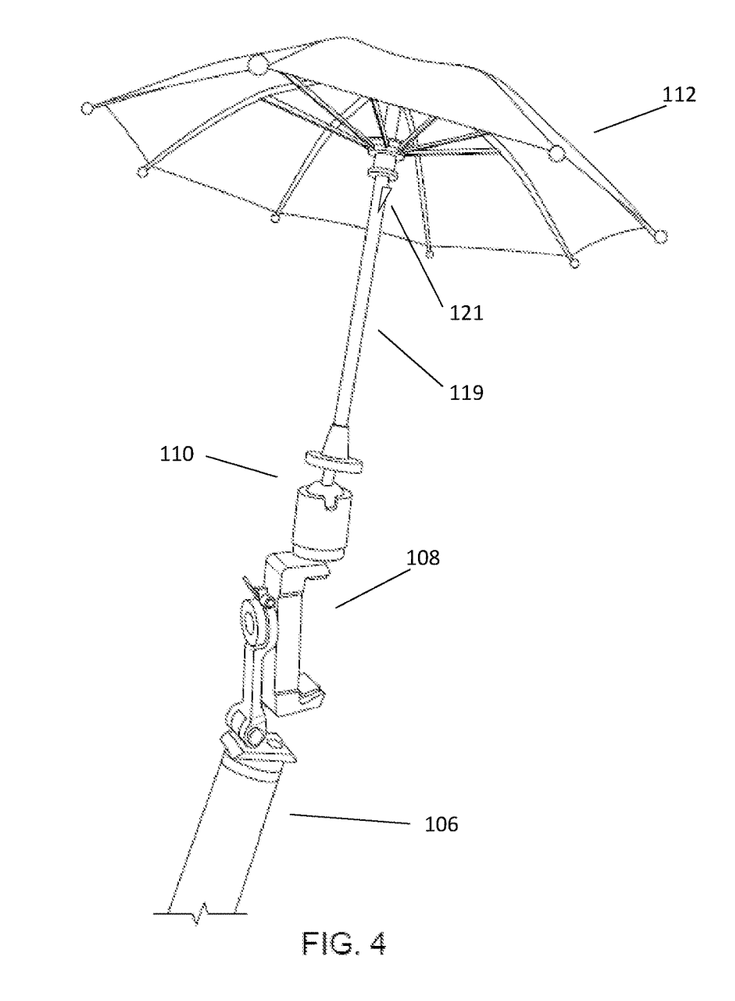
FIG. 4 is a view of a sunshade and sunshade arm coupled to a device holder through a ball joint in accordance with some embodiments.

FIG. 4 is a view of a sunshade 112 coupled to a sunshade arm 119 that is coupled to the top of a device holder 108 through a ball joint in accordance with some embodiments. The sunshade 112, sunshade arm 119, and ball joint 110 can be attached to device holder 108 by any suitable method such as screws, clips, magnets, the like or a combination thereof. The sunshade 112, sunshade arm 119, and ball joint 110 need not be attached to the top of device holder 108, but can be attached to the sides of device holder 108, to the user's device, or to other parts of the portable device mount system such as the pole 102 or power source 106. The sunshade 112, sunshade arm 119, and ball joint 110 can be attached to an extended arm or bracket attached to any part of the portable device mount system 100 The sunshade arm 119 can include a button or trigger 121 to open and close sunshade 112 in the event sunshade 112 is shaped as an umbrella or other shape that can open and close. The sunshade arm 119 does not need to be rigid, but can be foldable, flexible, bendable, or adjustable. The sunshade arm 119 need not resemble an umbrella pole, but can, for example, be a bracket or small telescopic pole. The ball joint 110 allows the sunshade arm to be easily tilted, rotated, or adjusted, such that the sunshade 112 can be pointed in multiple directions. This can be done manually or remotely in certain embodiments. The ball joint 110 can also be locked in a desired position. Although shown in FIG. 4 as an umbrella, the sunshade 112 may be of any size or shape and does not need to resemble an umbrella. For example, the sunshade can be rectangular shape and can be coupled to device 120 or the device holder 108 or any other part of the portable device mount system 100 with or without a sunshade arm.

Figure 5:
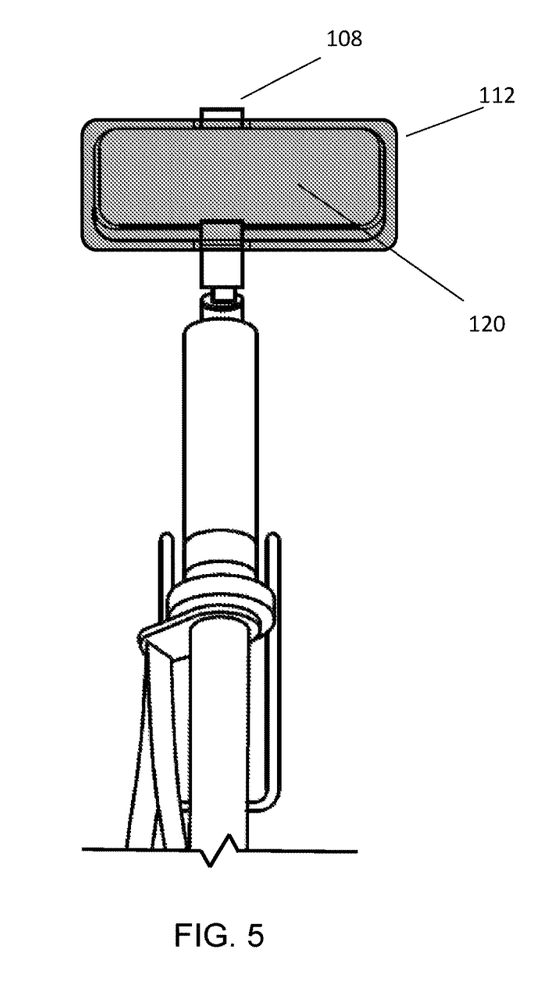
FIG. 5 is a view of a sunshade coupled a device holder in accordance with some embodiments.

FIG. 5 is a view of a sunshade 112 coupled to a device holder 108 in accordance with some embodiments. Sunshade 112 can be substantially rectangular shape and can be coupled to device holder 108 such that the sunshade 112 is in close contact with an electronic device 120 held in device holder 108 and substantially covers at least one side of the electronic device 120. Close contact in this context can include actually touching the device 120 or being a short distance away from the device 120 while close enough to provide shade. Sunshade 112 can be coupled to device holder 108 by any suitable method such as screws, clips, magnets, the like or a combination thereof. As shown in FIG. 5, device holder 108 can have top and bottom portions that squeeze onto a device 120, and sunshade 112 can attach to the top and bottom portions of device holder 108. Sunshade 112 can be a solid color or translucent to provide shade to a device 120 while allowing a user to see somewhat through the sunshade 112 to view the device 120. A sunshade 112 can be placed on either side of device 108 depending on a user's needs, such as where the sun is facing, and can include cutouts for camera lenses or buttons. Two sunshades can be used at the same time to provide shade to different sides of a device if needed.

Figure 6:
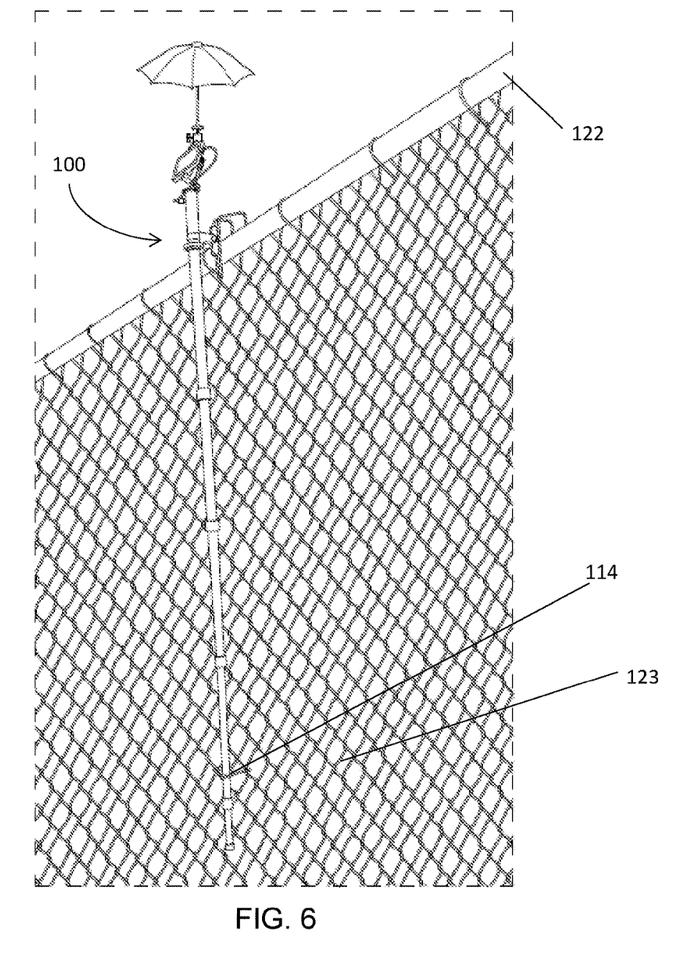
FIG. 6 is a portable device mount system mounted on a fence rail supporting a fence with mesh in accordance with some embodiments.

FIG. 6 is a view a portable device mount system 100 mounted on a fence rail 122 in accordance with some embodiments. The fence rail 122 supports a fence with fence mesh 123 in the shape of diamonds. A securing mechanism 114 is configured to secure the portable device mount system 100 to fence mesh 123 and to prevent movement of the user's device and of the portable device mount system 100. The securing mechanism 114 can be located on any part of the portable device mount system 100, including anywhere along pole 102 or the hanger.

Figure 7:
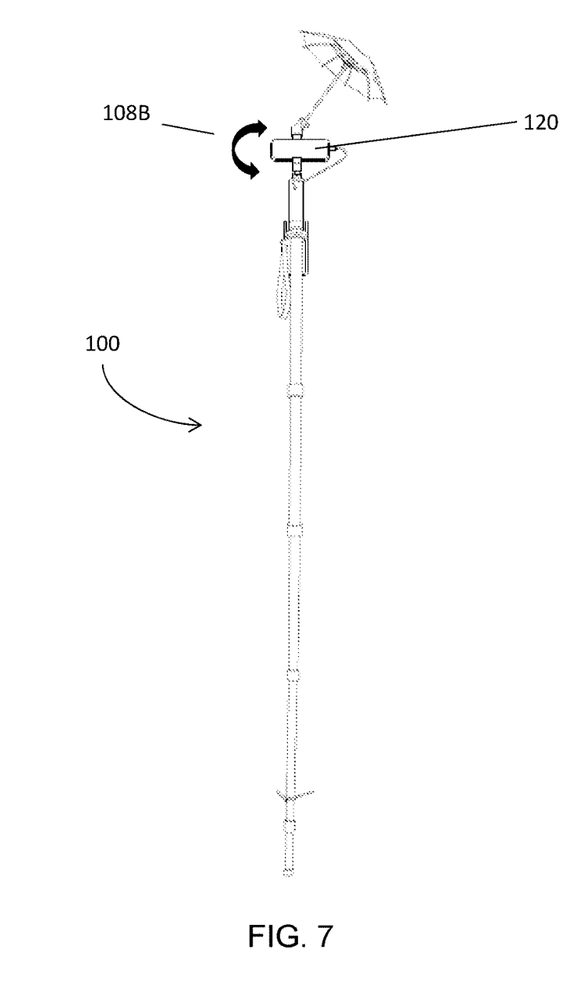
FIG. 7 is a portable device mount system in accordance with some embodiments.
Figure 8:
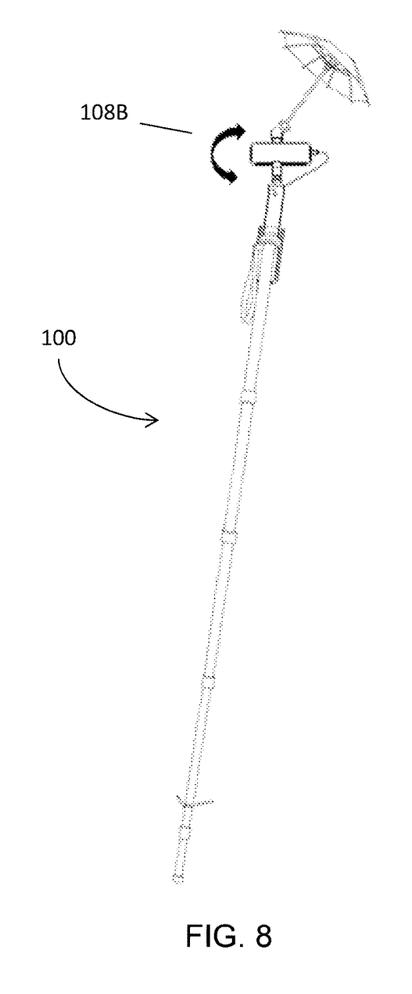
FIG. 8 is a portable device mount system mounted on a structure that is not level in accordance with some embodiments.

FIG. 7 is a view of a portable device mount system 100 in accordance with some embodiments. The device holder can rotate in the direction of 108B to place a device 120 in portrait or landscape mode or anywhere in between. FIG. 8 is similar to FIG. 7 but is intended to show the portable device mount system 100 mounted on a structure that is not level with the ground, such as on a fence rail that is slanted. In such an instance, the device holder 108 can be rotated in a direction 108B to account for any unevenness such that the view is level when recording. For example, in the case where a fence rail is slanted 30 degrees from left to right, the device holder can be rotated 30 degrees the opposite direction to result in a level view.

Figure 9:
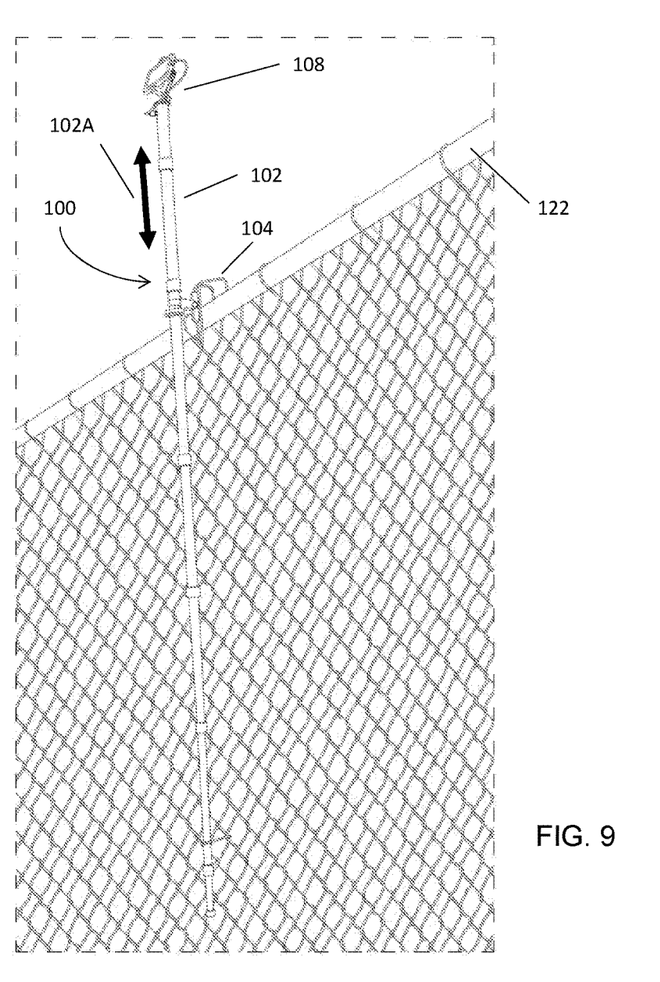
FIG. 9 is a portable device mount system mounted on a fence rail where the device holder is extended further away from the hanger in accordance with some embodiments.

FIG. 9 is a view a portable device mount system 100 mounted on a fence rail 122 in accordance with some embodiments. The pole 102 is a telescopic pole with multiple telescoping sections. One or more sections of the pole 102 can be extended or retracted. A user can extend one or more sections near the first end of the pole 102 in a direction 102A to position the device holder further away from the hanger. Positioning the device holder 108 away from the hanger 104 places the device holder farther up above the fence, and a user's device is then able to capture a larger portion of the field of play. In some embodiments, the device holder can be positioned at least twenty-four inches above the hanger.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portable device mount system comprising:
a telescopic pole with a first end and a second end opposite the first end;
a hanger coupled to the telescopic pole, the hanger configured to removably mount the portable device mount system onto a structure;
wherein the hanger includes a protruding knob configured to secure the hanger to a chain link fence;
a device holder near the first end of the telescopic pole;
wherein the device holder has opposite portions and one or more knobs;
wherein the device holder is configured to hold a smartphone by actuating the one or more knobs on the device holder to squeeze the smartphone between the opposite portions;
a sunshade coupled to the device holder at or adjacent to the one or more knobs on the device holder;
wherein the sunshade is substantially rectangular shape and positioned on top of, and substantially parallel to and flush with, a screen of the smartphone held in the device holder;
wherein the telescopic pole includes at least three telescoping sections and at least one of the telescoping sections is positioned between the hanger and the device holder and extends or retracts to vary the distance between the hanger and the device holder; and
wherein the hanger is bendable by hand to accommodate different size structures.

2. The portable device mount system of claim 1, wherein the at least one of the telescoping sections positioned between the hanger and the device holder is extendable by at least twenty inches.

3. The portable device mount system of claim 1, wherein the telescoping sections of the telescopic pole are lockable at a desired position using one or more flip lock mechanisms or twist lock mechanisms.

4. The portable device mount system of claim 1, wherein the device holder is configured to tilt automatically based at least in part on information received from the smartphone held in the device holder.

5. The portable device mount system of claim 1, wherein the device holder is configured to tilt remotely by a user.

6. The portable device mount system of claim 1 further comprising: a power source for charging the smartphone, wherein the power source is a battery, a photovoltaic system, or a combination thereof.

7. The portable device mount system of claim 1, wherein the device holder comprises one or more set points.

\* \* \* \* \*